F. W. KENNEDY.
THREE CORNERED BAG.
APPLICATION FILED AUG. 22, 1914.
1,163,545.
Patented Dec. 7, 1915.
4 SHEETS—SHEET 1.
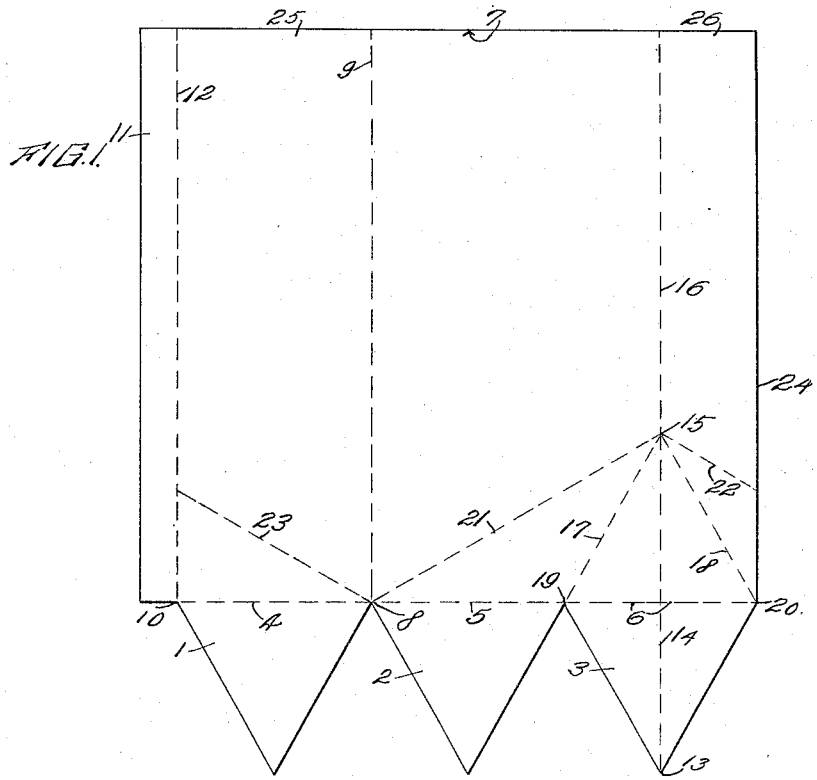
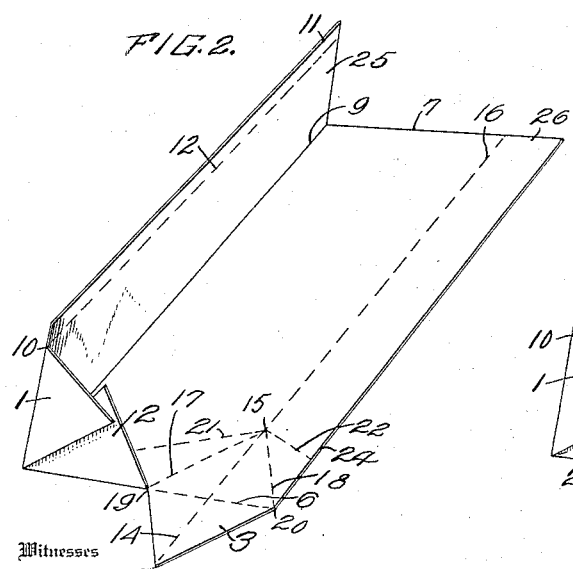
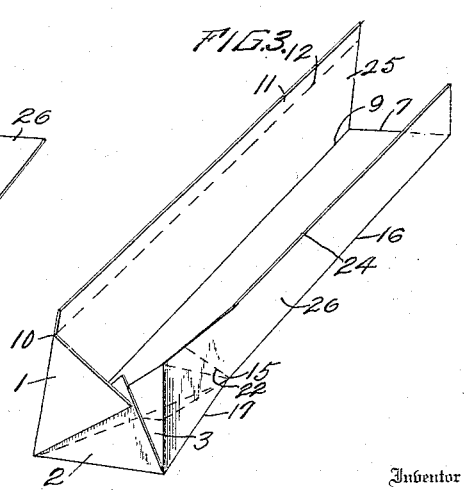
Inventor
Frederick W. Kennedy F. W. KENNEDY.
THREE CORNERED BAG.
APPLICATION FILED AUG. 22, 1914.
1,163,545.
Patented Dec. 7, 1915.
4 SHEETS—SHEET 2.
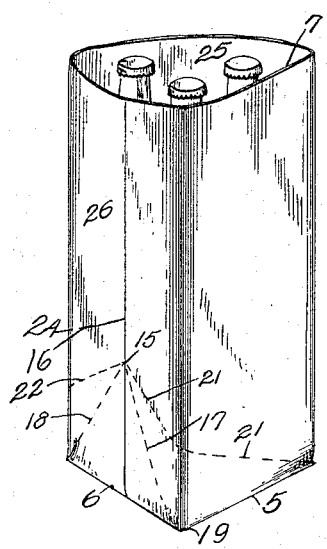
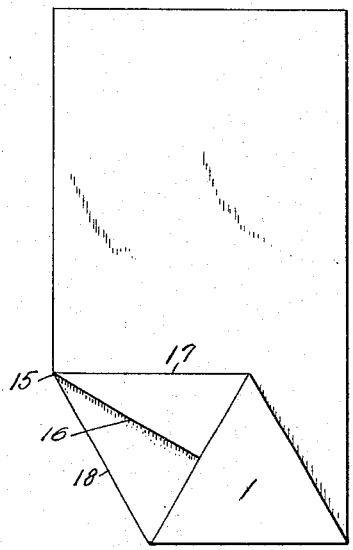
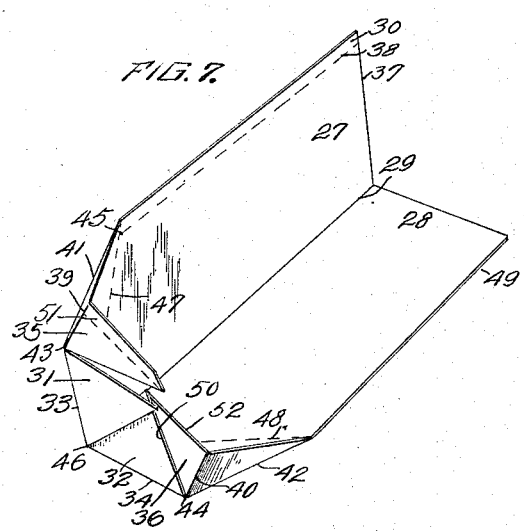
Inventor
Frederick W. Kennedy
Witnesses F. W. KENNEDY.
THREE CORNERED BAG.
APPLICATION FILED AUG. 22, 1914.
1,163,545.
Patented Dec. 7, 1915.
4 SHEETS—SHEET 3.
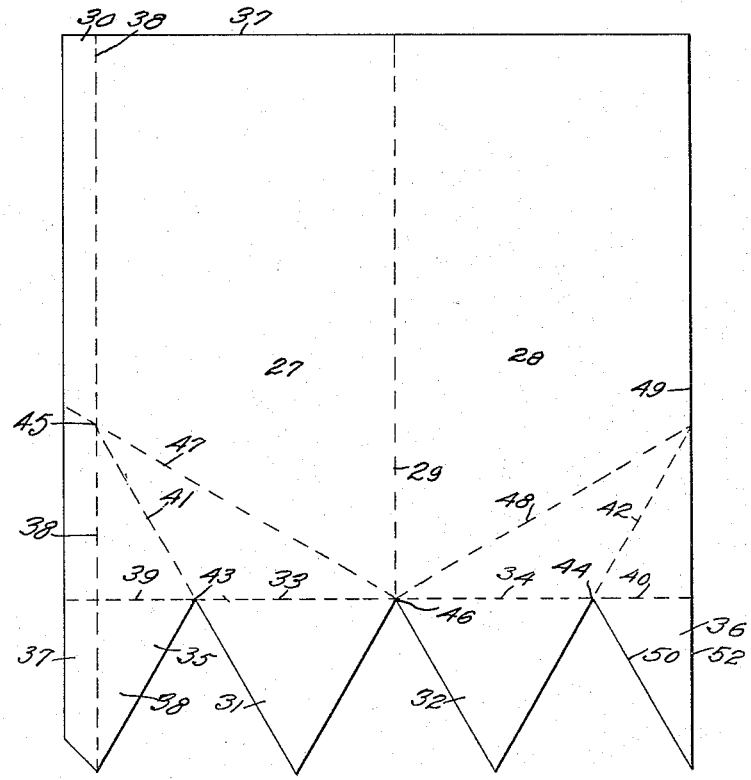
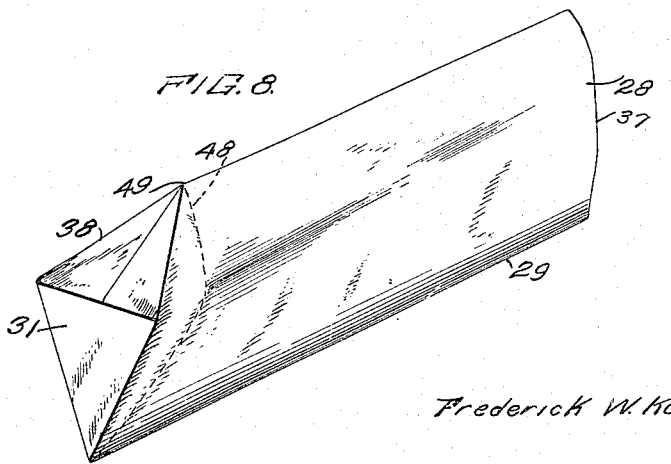
Witnesses
R. S. Trogner
W. H. Wakefield
Inventor
Frederick W. Kennedy
By Mason Fenwick & Lawrence
Attorneys F. W. KENNEDY.
THREE CORNERED BAG.
APPLICATION FILED AUG. 22, 1914.
1,163,545.
Patented Dec. 7, 1915.
4 SHEETS—SHEET 4.
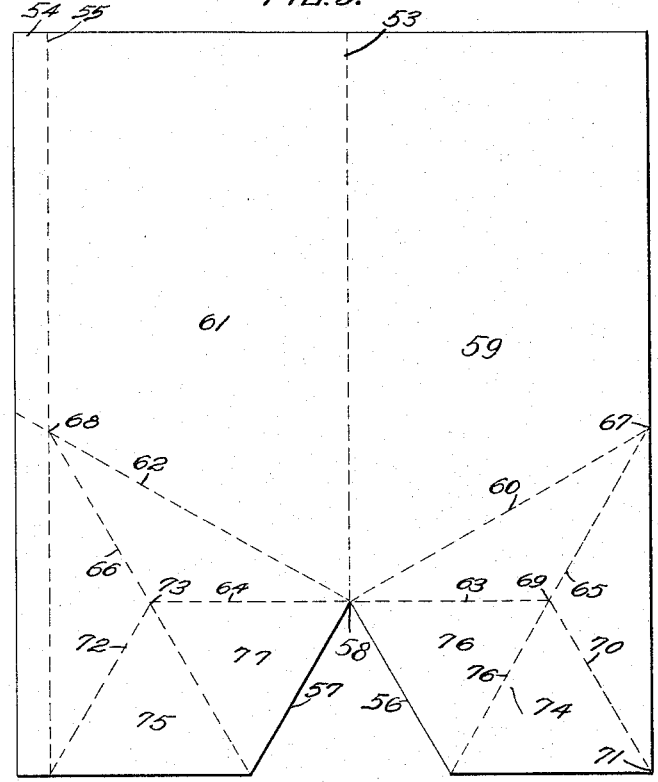
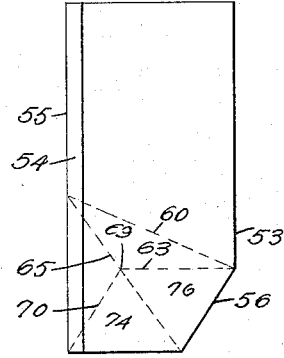
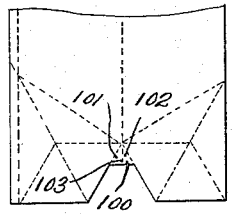
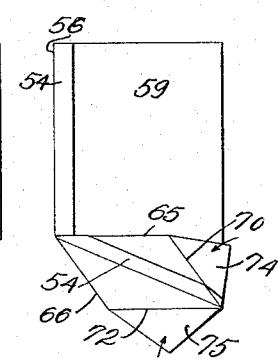
Inventor
Frederick W. Kennedy
Witnesses
A. M. Frogner
W. H. Wakefield
By Mason Fenwick & Lawrence
Attorneys

UNITED STATES PATENT OFFICE.

FREDERICK W. KENNEDY, OF SHELBYVILLE, INDIANA.

THREE-CORNERED BAG.

1,163,545.     Specification of Letters Patent.     Patented Dec. 7, 1915.

Application filed August 22, 1914. Serial No. 858,087.

*To all whom it may concern:*

Be it known that I, FREDERICK W. KENNEDY, citizen of the United States, residing at Shelbyville, in the county of Shelby and State of Indiana, have invented certain new and useful Improvements in Three-Cornered Bags; and I do hereby declare the following to be a full, clear, and exact description of the invention, such as will enable others skilled in the art to which it appertains to make and use the same.

This invention relates to paper bags, and an object of the invention is to provide a bag of special construction for holding articles which may be conveniently grouped together in triangular form.

Another object of the invention is to provide a blank from which the bag may be formed, so cut as to prevent waste of material.

With these and other objects in view the invention consists in certain features of construction and combinations of parts as will be hereinafter described and claimed.

In the accompanying drawings Figure 1 shows the blank with the lines of scoring necessary to fold the bag. Fig. 2 is a perspective view of the blank, showing one side bent upwardly in the process of folding the bag, Fig. 3 is a view similar to Fig. 2 with the sides folded to position about ready for gluing of the body proper flaps of the bag, Fig. 4 shows the completed bag in perspective, Fig. 5 shows a plan view of the bag folded for packing or storing, Fig. 6 shows a blank of a modified form of the invention, and Fig. 7 shows a view of the modification partly assembled. Fig. 8 is a perspective view showing the bag in open position. Fig. 9 is a blank of a still further modified form of the invention. Fig. 10 shows the form of the invention shown in Fig. 9 folded and glued to form a tube. Fig. 11 shows the modification in the process of folding the corners inwardly to provide the bottom. Fig. 12 is a modification of the blank shown in Fig. 9, to strengthen the corner construction.

The chief aim of the present invention is to provide a bag having a triangular bottom so formed as to house conveniently cylindrical articles such as bottles, for instance, and although the base of the bag shown in the drawings has the shape of an equilateral triangle, it is within the scope of the present invention to make the base an isosceles triangle or a scalene triangle to accommodate packages of different sizes and shapes.

The blank shown in Fig. 1 may be made of any suitable material, such as waterproof paper, and has extending from the bottom thereof three folds, 1, 2, and 3, respectively, the sides of which are equal, and meet at angles of substantially 60°. In order that these flaps may be bent with respect to the rest of the blank, alining lines of scoring 4, 5 and 6 are provided, along which the flaps 1, 2 and 3 respectively, may be bent. The blank may be of any length and preferably though not necessarily has the top thereof, as seen at 7, substantially parallel with the lines of scoring 4, 5 and 6. From the junction 8 of lines of scoring 4 and 5 there extends upwardly, and substantially perpendicularly with respect to the said lines of scoring, a longitudinal line of scoring 9, the purpose of which will be explained hereinafter.

The blank preferably extends beyond the outer side of the flap 1 as seen at 10 to provide a fold 11 defined by the line of scoring 12, which may be glued before folding.

Extending from the apex of the flap 3, as seen at 13, is a line of scoring 14 extending parallel to the line of scoring 9, which extends for a distance beyond the line of scoring 6 equal to the distance between the line of scoring and the apex 13, and terminates at 15. From 15 there is formed another line of scoring indicated at 16, extending parallel to the line 9 to the top 7. Lines of scoring 17 and 18 connect the point 15 with the point 19, defining adjacent ends of lines of scoring 5 and 6 and the point 20 at the outer end of the line of scoring 6, respectively. These last named lines of scoring define with the sides of the flap 3, a rhombus the acute angles of which are 60° while the obtuse angles are substantially 120°, and extending across the rhombus, the line of scoring 6 divides the rhombus into two equilateral triangles.

Extending from the point 15 to the point 8 is another line of scoring 21, which, as shown hereinafter, coöperates with the two lines of scoring 22 and 23. The lines of scoring 22 and 23 are made so that when the blank is folded they will be continuous and be substantially co-extensive with the line of scoring 21. The manner of determining the direction of these lines of scoring 22 and 23 can be had from a consideration of the relative widths of the portions of the blank located between the lines of scoring 9, 12 and 16 and the edge 24 of the blank. It is desired, when the bag is folded and glued together, to have the body of the bag lie flat, with but two creases, therefore the distance between lines of scoring 9 and 16 is made equal to one-half the distance between line 12 and edge 24, and in view of the fact that the line of scoring 16 is a continuation of the bisector of the triangle forming the flap 3, it is apparent that the distance between this line and the edge 24 is one-half the distance between lines of scoring 9 and 12. The fold 12 is of any satisfactory width and has no definite relation with respect to the other portions of the blank. From the proportions thus cited it will be seen that the line 22 must be inclined downwardly from the point 16, such that the end thereof in the side 24 will be below the point 15 a distance equal to one-third of the distance between said point 15 and the line of scoring 6.

When it is desired to form the bag from the blank already described, the top surface of the flaps 1 and 2 which are seen in Fig. 1 are glued while the bottom surface of flaps 2 and 3 which cannot be seen in Fig. 1 are glued, as is also the bottom of fold 11. The side 25 is then bent upwardly along the line of scoring 9, as is seen at Fig. 2, and the central flap 2 also bent upwardly from the blank. The flap 1 is also bent substantially at right angles to the side 25 and may be moved from the position shown in Fig. 2 to the position which will overlie the upstanding flap 2 and afterward these two flaps can be pressed together, and the fold 11 bent downwardly preparatory to bending the blank into the position shown in Fig. 3.

In Fig. 3 the side 26 is shown bent upwardly from the blank and the flap 3 is shown as passing behind the flap 2, whereas the flap passes in front thereof, having reference to Fig. 3. The edge 24 of side 26 lies above the glued fold 11 and after the flap 3 has been moved so as to lie substantially in alinement with the central flap 2, the said flap can be pressed against the central flap and the fold along edge 24 secured. This will provide a bag substantially as shown in Fig. 4, which, however, will have to be folded flat before the same can be packed in any numbers. From the position shown in Fig. 4 the triangular bottom and the portion defined between the lines of scoring 17 and 18 are bent until they are parallel with the plane of the body of the bag, this fold taking place along lines of scoring 21 and the line of scoring composed of the two lines 22 and 23 respectively, after which the bag will be formed as shown in Fig. 5.

In the form of the invention already described it will be possible, of course, to assemble the bottom of the bag without gluing the flap 2 on either side, and it will be apparent that none of the glued surfaces are creased.

The blank from which the modified form of the invention is made is shown in Fig. 6, and as shown there comprises sides 27 and 28 respectively, which are separated by means of a line of scoring 29, extending longitudinally and, with the exception of the fold 30, centrally of the blank. The flaps 31 and 32 respectively are cut in substantially the same manner as the flaps 1, 2 and 3 in the preferred form of the invention, lines of scoring 33 and 34, respectively, being provided for hinged movement of the flaps 31 and 32. The modified form is different from the preferred form in that the sides of the blank have depending therefrom triangular portions 35 and 36 respectively which are equal to one-half of the flaps 31 and 32 while the fold 30 extends from the top 37 to the lower point of the flap 35 and is bent along the line of scoring 38. Lines of scoring 39 and 40 are provided to afford hinged movement of the flaps 35 and 36, respectively, with respect to the blank, while lines of scoring 41 and 42 extend upwardly from the points 43 and 44 respectively at angles of 60° with respect to the lines of scoring 39 and 40 respectively. Extending from the intersection of the line 41 and the line of scoring 38, as at 45, to the bottom, is the line of scoring 47 which serves the same function as the line of scoring 21 in the preferred form. In the modified form, however, the other line of scoring which is coextensive with the line of scoring 41 is not made of two disjointed lines but is made of one and is shown as extending upwardly from the point 46 toward the edge 49 at an angle of 30°.

As shown in Fig. 7, when it is desired to assemble the modified form of bag, the top of the flaps 31 and 32, as seen in Fig. 6, are glued, while the bottoms of the flaps 35 and 36, as seen in Fig. 6, together with the bottom of the fold 30 are glued, after which the flap 31 is bent upwardly and the side 27 bent upwardly along the line 29, the flap 31 having previously been bent along the line of scoring 33 and extending upwardly so as to lie in front of the flap 32, as seen in Fig. 2. The flap 36 is then bent downwardly until the edge 50 lies along the line of scoring 34, after which the flap 35 is fastened and the lower portion of fold 30 as seen at 51 lies over the outer edge 52 of the flap 36, in which position all the flaps are secured together and the fold 30 fastened under the edge 49.

The principal difference between the blank found in the modified form and that of the preferred form is that the seam in the preferred form extends longitudinally of one of the sides of the bag when the latter is folded, whereas in the modified form the seam is at one of the edges. This, however, does not interfere with the folding of the bag, inasmuch as the bottom parts of the bag of the modified form are bent along the lines of scoring 47 and 48, so that the same lies substantially in a plane with the body of the bag.

Still another modification of the invention may be employed as shown in Fig. 9. In this form, the blank has a crease 53 and a fold 54 which may be bent along the line of scoring 55. The lower edge of the blank has a V-shaped cut in it having the sides 56 and 57 respectively which are inclined substantially at an angle of 60° to each other. These sides terminate in a base 58 on the line of scoring and crease 53. Extending upwardly from each side of the line of scoring 53 and from the point 58 is a line of scoring, that shown in the portion 59 of the blank being designated at 60 while that shown in the part 61 of the blank being designated at 62. Extending horizontally from the point 58 are lines of scoring 63 and 64 which extend upon the portions 59 and 61 respectively of the blank. These last named lines of scoring do not extend to the vertical edges but terminate in lines of scoring 65 and 66 respectively which are formed at an angle of 30° respectively to the lines of scoring 60 and 62 respectively and have their upper ends terminated in the point defining the intersection of the lines 60 and 62 and the sides of the blank. These points are designated at 67 and 68 respectively, the fold 54 extending beyond the point 68. Extending from the point 69 defined by the intersection of lines of scoring 63 and 65 is a line of scoring 70 which extends from said point to the lower right hand corner of the blank as at 71. A similar line of scoring 72 extends from point 73 formed by the intersection of lines of scoring 54 and 56 respectively.

When it is desired to fold the bag of this last named modification, the two parts 59 and 61 are folded along the line of scoring 53 after which the fold 54 is turned over and secured to the adjacent edge of the part 59. After this, the portions of the lower part of the blank defined between the lines of scoring 55 and 56 and their respective vertical edges of the blank, are bent along said lines of scoring 65 and 66, and in bending over to become substantially parallel with the blank, the part of the blank between lines of scoring 60 and 65 will bend along the line of scoring 60 to lie flat against part 59 of the blank. After this, it will be seen that line of scoring 70 is superposed upon line of scoring 63 whereas line of scoring 72 is superposed upon line of scoring 64 so that equilateral triangles 74 and 75 are superposed upon their adjacent equilateral triangles 76 and 77 respectively. The triangle 74, together with triangle 76, may thus be bent along the lines of scoring 70 and 63 respectively until the same lie flat as shown in Fig. 10. The triangles 75 and 77 may then be bent along their lines of scoring 72 and 64 respectively until they are superposed upon triangles 74 and 76.

Any method may be employed for securing the superposed triangles to each other and to the lower layer of paper immediately under triangle 74. The bag may then be made to assume the form shown in Fig. 8 and later folded as shown in Fig. 4, the bag having the same general appearance as that shown in Fig. 6.

Of course, it will be possible for the bottom of the bag to be folded along lines of scoring 62 instead of line of scoring 60 and it is also noted that it is immaterial which side of equilateral triangles is superposed upon the other.

It is noted that the bottom is not folded so that no cause is given for breaking the glue which secures the folds of the bag together.

As seen in Fig. 12, the V-shaped cut in the bottom of the blank may be provided by leaving in the point of the V a portion 100 having triangular portions 101 and 102 separated by a central line of scoring 103. The object of this portion 100 is to reinforce the corner of the bag at point 58.

What is claimed is:

1. A three cornered bag formed of a blank having a main rectangular portion, a plurality of flaps projecting from one edge of the blank and being of triangular formation, the base of one of the triangles terminating at one edge of the blank and the base of another of the triangles terminating at a point slightly distant from the opposite edge of the blank, the third triangle being located between the first two, and the blank having a line of scoring extending from each end of the base of the second triangle and longitudinally of the blank, a line of scoring extending from the apex of the first of said triangles and longitudinally of the blank, a line of scoring running from each end of the base of the first triangle to a given point on the line of the longitudinal scoring last mentioned, a line of scoring extending from said point to one end of the adjacent longitudinal scoring, and an additional scoring extending at the same angle and from the scoring last mentioned to the remaining longitudinal scoring.

2. A three cornered bag formed of a blank having a main rectangular portion, a plurality of flaps projecting from one edge of the blank and being of triangular formation, the base of one of the triangles terminating at one edge of the blank and the base of another of the triangles terminating at a point slightly distant from the opposite edge of the blank, the third triangle being located between the first two, and the blank having a line of scoring extending from each end of the base of the second triangle and longitudinally of the blank, a line of scoring extending from the apex of the first of said triangles and longitudinally of the blank, the distance between two of the aforesaid longitudinal scoring lines being equal to one-half of the distance between the third longitudinal scoring line and one edge of the blank, a line of scoring running from each end of the base of the first triangle to a given point on the line of the longitudinal scoring last mentioned, a line of scoring extending from said point to one end of the adjacent longitudinal scoring and an additional scoring extending at the same angle and from the scoring last mentioned to the remaining longitudinal scoring.

In testimony whereof I affix my signature in presence of two witnesses.

FREDERICK W. KENNEDY.

Witnesses:
CARL THOMS,
CLANCY COLVIN.

Copies of this patent may be obtained for five cents each, by addressing the "Commissioner of Patents. Washington, D. C."